March 12, 1963

D. K. DICKEY ET AL 3,081,115

SEMI-TRAILER KINGPIN RECEIVING MEANS

Filed Jan. 11, 1961

INVENTOR.
Donald K. Dickey, &
BY Michael J. Principe

J. L. Carpenter
ATTORNEY

INVENTOR.
Donald K. Dickey, &
BY Michael J. Principe

ATTORNEY

March 12, 1963  D. K. DICKEY ET AL  3,081,115
SEMI-TRAILER KINGPIN RECEIVING MEANS
Filed Jan. 11, 1961  3 Sheets-Sheet 3
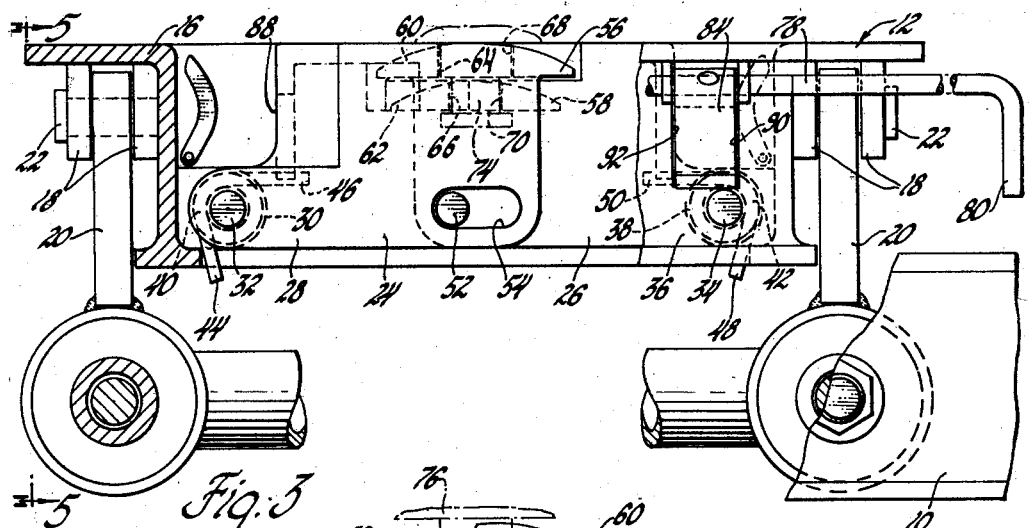
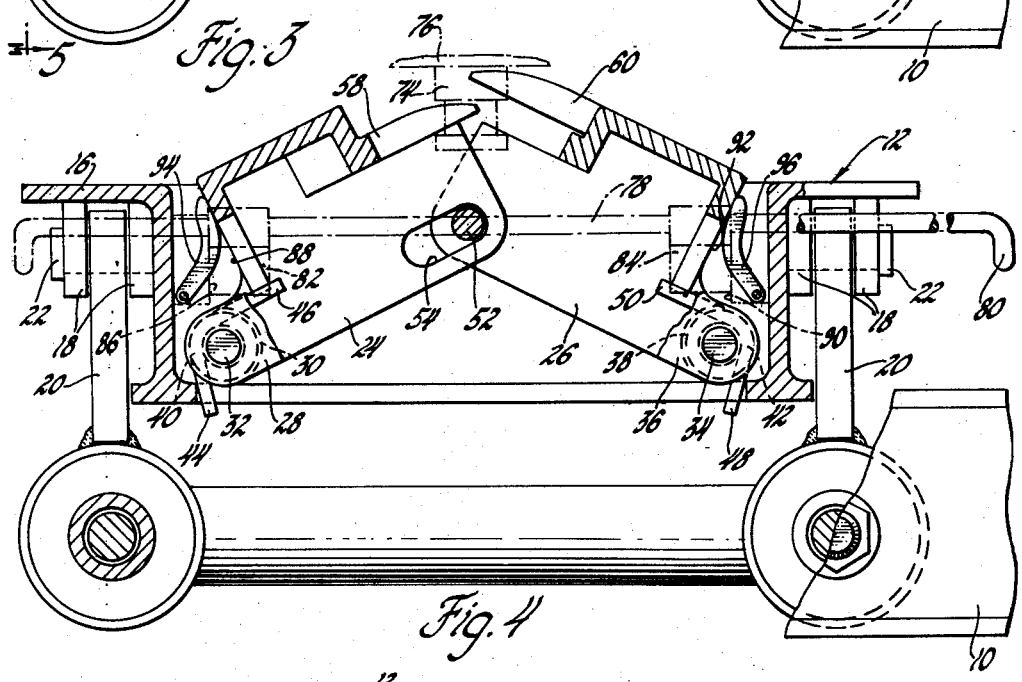
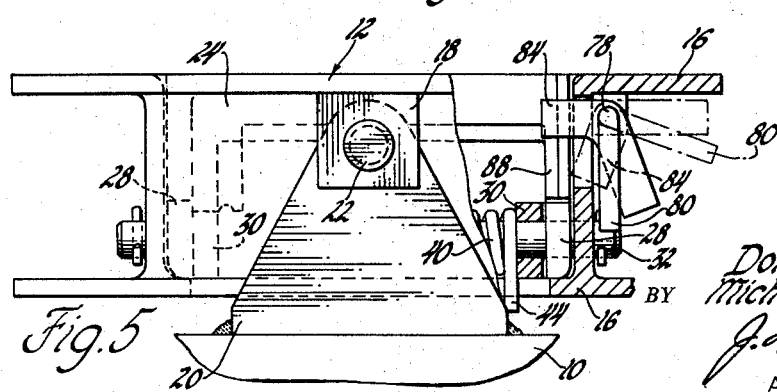
INVENTOR.
Donald K. Dickey, &
Michael J. Principe
BY
J. L. Carpenter
ATTORNEY

United States Patent Office 3,081,115
Patented Mar. 12, 1963

3,081,115
SEMI-TRAILER KINGPIN RECEIVING MEANS
Donald K. Dickey and Michael J. Principe, London, Ontario, Canada, assignors to General Motors Corporation, Detroit, Mich., a corporation of Delaware
Filed Jan. 11, 1961, Ser. No. 82,014
9 Claims. (Cl. 287—20)

This invention relates generally to railway vehicles adapted to transport highway semi-trailers and particularly to means on such vehicles for receiving and anchoring the kingpin end of such semi-trailers.

Over the past few years there has been a great deal of consideration given to various devices adapted to receive and secure semi-trailer kingpins especially for use on railway vehicles for transporting highway semi-trailers. The nature of such devices often depends on the manner in which the semi-trailer is loaded on the vehicle. For example, in some cases the semi-trailers are loaded on the railway cars from one end by driving the tractor and semi-trailer along the length of the railway vehicle and thereafter separating the tractor from the semi-trailer. In other cases the semi-trailers are driven onto the vehicle from either side by the tractor or some special loading device. In yet other cases the semi-trailers are bodily lifted by a special lifting device adjacent one side of the vehicle and lowered in place thereon. All such manners of loading give rise to different problems so far as a kingpin hitch is concerned.

The present invention is particularly concerned with the problems encountered in such a kingpin receiving means when it is loaded from the top; that is, the special loader picks up the trailer and lifts it vertically until it clears the railway vehicle so it can be moved over and lowered into position on the vehicle. It will be appreciated, however, that the special semi-trailer kingpin hitch may be adapted for other types of loading.

One of the problems encountered in what will be referred to hereafter as overhead loading but which is not peculiar thereto is locating the kingpin so that it is readily received by the hitch. While the loaders which raise the semi-trailers are quite maneuverable, it will be readily apparent that if it is necessary to precisely locate the kingpin before it can be received by the hitch the process will be both time consuming and difficult.

The present hitch when in its open or unlocked position provides an opening for the reception of the kingpin which is substantially larger than the kingpin itself so that only approximate locating is required. Once the kingpin has been approximately located, however, as the semi-trailer is lowered by the loader, its own weight will force the hitch downwardly into a locked position and as the hitch moves downwardly it will precisely locate the kingpin end of the semi-trailer.

As an additional feature of the present invention, as the jaws of the hitch are moved to the lower locked position of the hitch, the hitch will automatically lock itself in this lowermost position and securely grip the kingpin received therein so that in the event of derailment or upset the kingpin end of the semi-trailer will remain secured to the railway vehicle.

The present invention also includes as a special feature thereof manually operated means which may be momentarily operated and then left by the operator which will, when the semi-trailer is raised by the loading and unloading device, allow the jaws of the hitch to pivot upwardly thereby releasing their grip on the semi-trailer kingpin and reset the kingpin receiving device so that it is again ready to receive the kingpin end of a semi-trailer.

It is, therefore, an object of this invention to provide a novel semi-trailer kingpin hitch for use on railway vehicles adapted to carry semi-trailers which may be loaded by lowering the kingpin end of the semi-trailer on the hitch.

It is a further object of the invention to provide in such a hitch means which when the kingpin end of a semi-trailer is lowered thereon will automatically lock the hitch about the kingpin and automatically secure the kingpin in place in the hitch in the case of derailment or upset of the railway vehicle.

It is a further object of this invention to provide means in combination with a special top loading hitch which may be momentarily operated to set the hitch for release of the kingpin end of the vehicle as the vehicle is vertically raised by a suitable loading and unloading device.

For a fuller understanding of the above and other objects of this invention, reference may be made to the accompanying detailed description taken in conjunction with the drawings, in which:

FIGURE 3 is a view in elevation of the hitch taken on the line 3—3 of FIGURE 2 also with parts broken away and in section further illustrating the details thereof. FIGURE 3 also shows the special jaws of the hitch in their lower or locked poistion securely gripping the semi-trailer kingpin and supporting the kingpin end of the semi-trailer.

FIGURE 4 is a view somewhat similar to that of FIGURE 3 except that other parts are broken away and in section and the jaws of the hitch are shown in their extreme upper position prior to being moved downwardly under the load of the kingpin end of the semi-trailer.

FIGURE 5 is a side view in elevation taken substantially on the line 5—5 of FIGURE 3 illustrating the mounting of the hitch and also some of the details of the special locking means for maintaining the jaws of the hitch in the locked position in the event of derailment or upset of the railway vehicle.

Figure 1:
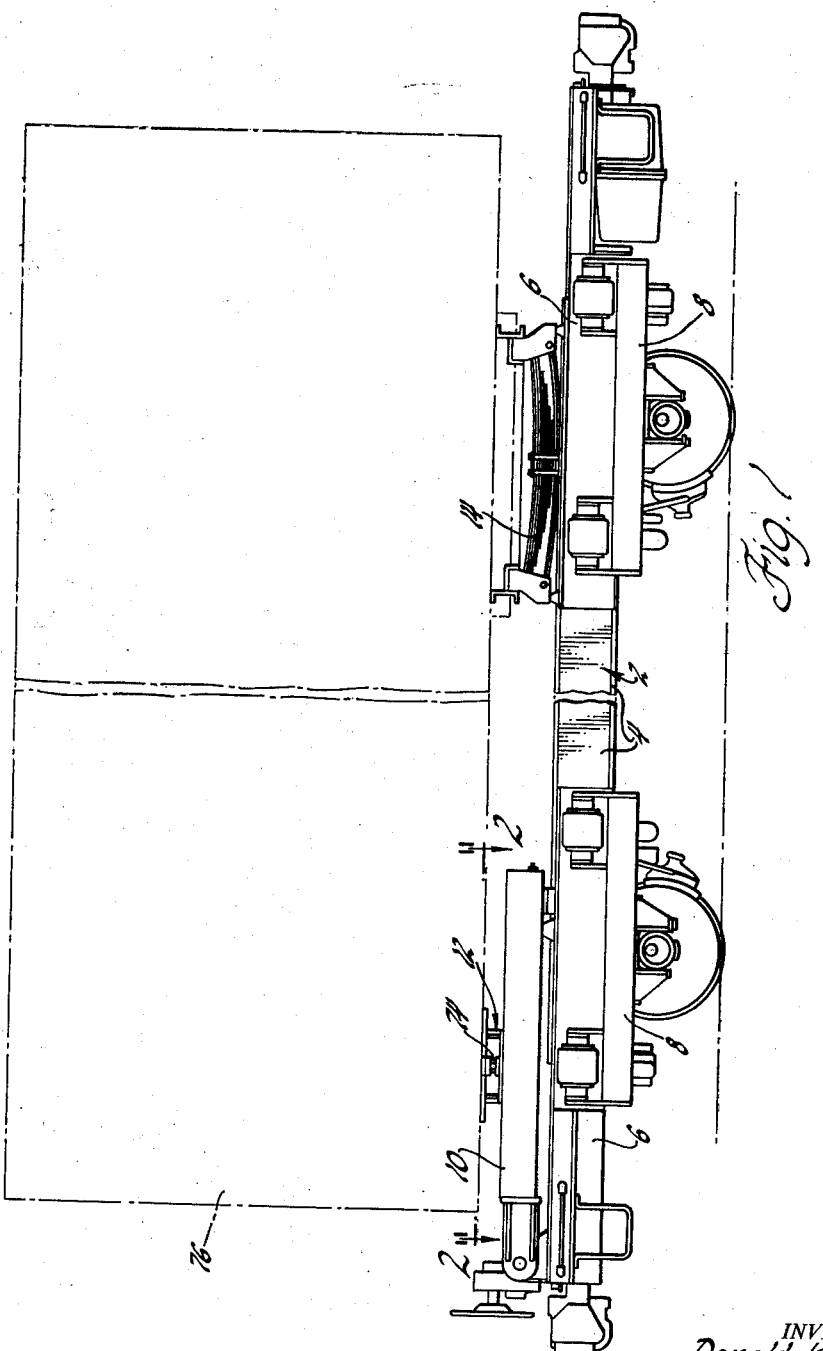
FIGURE 1 is a side view in elevation of a railway vehicle including the novel hitch and having a highway semi-trailer superimposed thereon with its kingpin received in the special hitch.

Referring first to FIGURE 1, a special railway vehicle indicated generally by a numeral 2 is shown. The vehicle itself includes a center sill 4 having built-up platforms 6 at opposite ends thereof. Each platform 6 is supported by a single axle truck assembly 8. The end of the railway vehicle which is adapted to receive and support the kingpin end of a semi-trailer is provided with a secondary suspension 10 in turn supporting the semi-trailer kingpin receiving means indicated generally by the numeral 12. A highway semi-trailer 76 with its bogie removed is shown in phantom supported on the railway vehicle 2. The bogie end of the semi-trailer it will be noted is supported on the railway vehicle by means of a secondary suspension 14 whereas the kingpin end of the semi-trailer is shown supported by the upper surfaces of the special loading hitch 12 and with the kingpin received and secured in the hitch 12.

Referring now to FIGURES 2, 3, 4 and 5 the details of the hitch will be described. The hitch 12 comprises a supporting frame or base 16 which is in turn pivotally supported on the secondary suspension 10 by means of oppositely disposed sets of upper and lower brackets 18 and 20 and pins 22. Pivotally secured at their lower outer corners to the base member 16 and supported thereby are a pair of oppositely disposed jaws 24 and 26. Jaw 24, it will be noted, is provided with bored extensions 28 and base member 16 is provided with bored inwardly extending projections 30 through which a pin 32 extends to form the pivoting axis of jaw 24 on base member 16. The jaw 26 is mounted in a similar manner by means of a pin 34 extending through outward lower extensions 36 on jaw 26 and inwardly extending projections 38 on base member 16. Wound around pins 32 and 34 are torsion springs 40 and 42, respectively. Spring 40 has one end 44 restrained by base member 16 and an opposite end 46 anchored against a portion of jaw 24 so that it exerts a bias on jaw 24 tending to rotate it in a counter-clockwise manner about its pivot pin 32 as viewed in FIGURE 4. Similarly, torsion spring 42 has an end 48 restrained by base member 16 and an opposite end 50 exerting a bias on jaw 26 tending to rotate it clockwise about its pin 34. The upward movement of jaws 24, 26 is limited by a pin 52 secured to the lower inner corner of jaw 26 which is adapted to move back and forth in a slot 54 provided in jaw 24. The ends of slot 54 correspond to the upper and lower extreme positions of the jaws 24 and 26.

Figure 2:
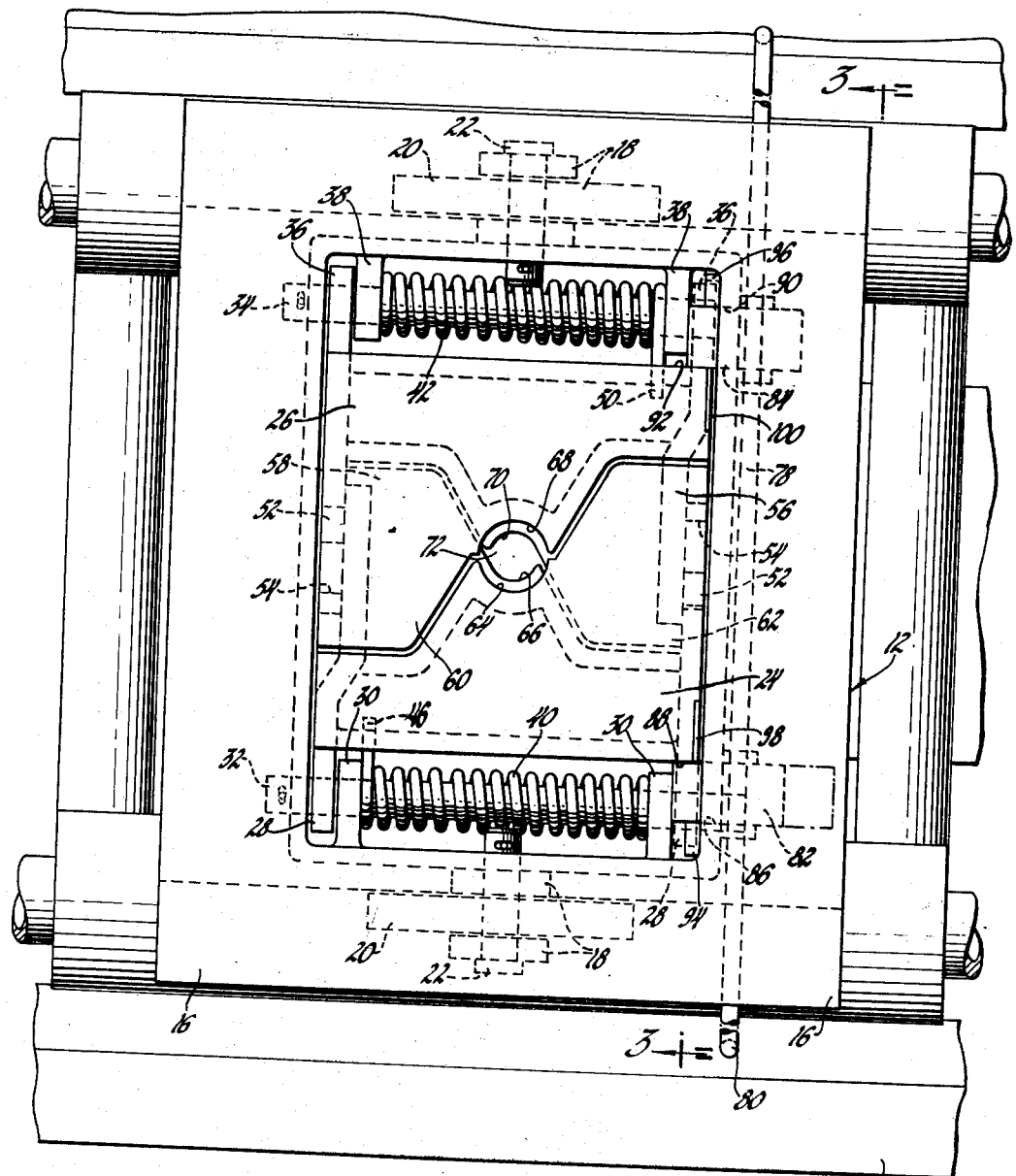
FIGURE 2 is a top view of the special loading hitch with parts broken away and in section showing various details thereof.

From FIGURE 4 particularly and also from FIGURES 2 and 3 it may be observed that the upper sides of the jaws are provided with upper and lower interlocking tongues. The upper and lower tongues of jaw 24 are indicated by the numerals 56 and 58, respectively. The upper tongue 56, it will be noted, is axially offset from the lower tongue 58 on jaw 24. The upper and lower tongues of jaw 26 are indicated by the numerals 60 and 62, respectively. These tongues 60 and 62 of jaw 26 are also offset axially with respect to each other. The tongues of jaws 24 and 26 are arranged so that as the jaws move downwardly about their axes lower tongue 58 of jaw 24 moves beneath upper tongue 60 of jaw 26 whereas lower tongue 62 moves beneath upper tongue 56. In other words, because of the arrangement of the tongues 56, 58, 60, and 62, as well as pin 52 and slot 54, the movements of the jaws 24 and 26 are related so that they move upwardly and downwardly together about their respective pivot axes.

Formed in the tongues 56, 58, 60 and 62 are recesses 64, 66, 68, and 70, respectively, which define an opening 72 for reception of the kingpin 74 fixed to the underside of the kingpin end of semi-trailer 76. The jaws of the semi-trailer hitch when in their upper position as indicated in FIGURE 4 define an opening which is substantially larger than the semi-trailer kingpin. As the semi-trailer is lowered onto the upper tongues 56 and 60 of the jaws 24 and 26, the jaws move downwardly and the opening 72 becomes smaller until it is substantially the same size as the kingpin 74 to thereby securely grip the kingpin. Since the opening 72 is substantially larger than the kingpin when the jaws are in their upward or unlocked position, the person operating the loading device does not have to be too precise in locating the kingpin in opening 72. As the semi-trailer is lowered, the jaws because of their configuration and because of the weight of the semi-trailer will precisely locate the kingpin end of the semi-trailer on the railway vehicle.

A special locking means has been provided which maintains the jaws 24 and 26 in their down or locked position so that they will securely grip the kingpin 74 in the event derailment or upset should occur. This locking means includes a shaft 78 journaled by the base member 16. Shaft 78 has an operating handle 80 on one end thereof.

Fixed to the shaft 78 almost directly above each of the jaw pivot pins 32 and 34 are weights 82 and 84, respectively. These weights are arranged in an eccentric manner on shaft 78 so that they tend to fall into engagement with the sides of jaws 24 and 26. When the jaws move to their lowermost position as indicated in FIGURE 3, the weight 82 will move between an abutment 86 on base member 16 and an abutment 88 on the backside of jaw 24. Similarly, the weight 84 will move between an abutment 90 on the base member 16 and an abutment 92 on jaw 26. Since these weights 82 and 84 are fixed to shaft 78 they naturally move together in the aforementioned manner under the influence of gravity. It will be noted that the width of the weights 82 and 84 are substantially the same as the space between abutments 86, 88 and 90, 92, respectively. These spaces between these sets of abutments when the jaws are in their upward position, however, are less than the width of the sets 82 and 84 so that they cannot enter such spaces until the jaws have moved to their lower or locked position. When the jaws 24 and 26 are in their lower locked position with the semi-trailer kingpin 74 gripped therebetween and the weights 82 and 84 are locking these jaws in this lower locked position, in order for an operator to release the jaws so that the semi-trailer may be lifted upwardly by the unloading device, the operator turns the handle 80 to rotate shaft 78 and thus the weights 82 and 84 from between their respective sets of abutments 86, 88 and 90, 92. As the operator does this, a set of pawls 94 and 96 move, also under the influence of gravity, in front of the weights 82 and 84 preventing their re-entry into the spaces provided between their respective sets of abutments 86, 88 and 90, 92.

Now, as the semi-trailer is lifted, because of the torsion springs 40 and 42, the jaws 24 and 26 will move upwardly and in so doing will carry the pawls 94 and 96 upwardly out of the way of the weights 82 and 84. Weights 82 and 84 now move downwardly under gravity a sufficient amount to block the pawls 94 and 96 back out of the paths of movement of the weights 82 and 84 so that as the hitch is again loaded and the jaws 24 and 26 again move downwardly to their locked position the weights 82 and 84 may again fall between their respective sets of abutments 86, 88 and 90, 92 again locking the jaws in the lower locked position. It will be noted that jaws 24 and 26 on one side thereof are provided with recesses 98 and 100 which allow the weights 82 and 84 to fall forward and downward sufficiently to block off the pawls 94 and 96 after they have been moved out of the path of the weights 82 and 84 by upward movement of the jaws 24 and 26.

From the foregoing description it will be appreciated that the present hitch is particularly adapted for use on railway vehicles which carry highway semi-trailers. It is especially made so that the semi-trailers may be loaded from the top, i.e., raised by a suitable loading device and then lowered onto the vehicle. The hitch is automatic in its locking action and requires just momentary operation by the operator in order to set it for release of the semi-trailer and also for relocking when a new semi-trailer kingpin is to be secured thereby.

We claim:

1. Means for the reception of a semi-trailer kingpin comprising a supporting base, a pair of co-acting jaws each supported by said base for pivotal movement about its own horizontal pivot axis and defining an opening therebetween for the reception of a semi-trailer kingpin, said jaws having an upper unlocked position in which the opening defined therebetween is larger than the kingpin to be received thereby and a lower locked position in which said opening is substantially the same size as the kingpin to be received thereby and the axis of said opening with said jaws in locked position is normal to and spaced between the pivot axes of said jaws, means acting between said jaws and supporting base exerting a bias on said jaws toward said unlocked position, and convexly curved upper supporting surfaces on said jaws adapted to tangentially engage and support the underside of the kingpin end of a semi-trailer whereby the weight thereof moves said jaws downwardly against said bias to cause said jaws to grip the kingpin adapted to be received thereby.

2. Means for the reception of a semi-trailer kingpin comprising a supporting base, a pair of oppositely disposed jaws each supported by said base for pivotal movement about a respective horizontal pivot axis, said axes lying in the same horizontal plane and being parallel to each other, said jaws having upper and lower interlocking tongues relating the movements of said jaws to each other about their respective pivotal axes and defining an opening therebetween for the reception of a semi-trailer kingpin, said jaws having an upper unlocked position in which the opening defined therebetween is larger than the kingpin to be received thereby and a lower locked position in which said opening is substantially the same size as the kingpin to be received thereby and the axis of said opening with said jaws in locked position is normal to and spaced between the pivot axes of said jaws, means acting between said jaws and said supporting base exerting a bias on said jaws toward said unlocked position, and upper convexly curved supporting surfaces on said jaws adapted to tangentially engage and support the underside of the kingpin end of a semi-trailer whereby the weight thereof moves said jaws downwardly against said bias to cause said jaws to grip the kingpin adapted to be received thereby.

3. The combination of claim 2 which includes means co-acting between said jaws to limit the upward pivotal movement of said jaws.

4. The combination of claim 3 in which said latter means comprises a pin secured to one of said jaws, the other of said jaws having a slot formed therein in which said pin resides for limited movement between the opposite ends of said slot corresponding to the upper unlocked position and lower locked position respectively of said jaws.

5. Means for the reception of a semi-trailer kingpin comprising a supporting base, a pair of jaws each supported by said base for pivotal movement about a horizontal pivot axis and defining an opening therebetween for the reception of a semi-trailer kingpin, said jaws having an upper unlocked position in which the opening defined therebetween is larger than the kingpin to be received thereby and a lower locked position in which said opening is substantially the same size as the kingpin to be received thereby and the axis of said opening with said jaws in locked position is normal to and spaced between the pivot axes of said jaws, a torsion spring for each jaw mounted along the associated horizontal axis thereof having an end engaging its associated jaw and an opposite end engaging said supporting base to bias the associated jaw about its horizontal axis in an upward direction toward said unlocked position, upper convexly curved supporting surfaces on said jaws adapted to receive and support the underside of the kingpin end of a semi-trailer whereby the weight thereof moves said jaws downwardly against the bias of said torsion springs to cause said jaws to grip the kingpin adapted to be received thereby.

6. Means for the reception of a semi-trailer kingpin comprising a supporting base, a pair of oppositely disposed jaws each supported by said base for pivotal movement about a respective horizontal pivot axis, said axes lying in the same horizontal plane and being parallel to each other, said jaws defining an opening therebetween for the reception of the semi-trailer kingpin, said jaws having an upper unlocked position in which the opening defined therebetween is larger than the kingpin to be received thereby and a lower locked position in which said opening is substantially the same size as the kingpin to be received thereby and the axis of said opening with said jaws in locked position is normal to and spaced between the pivot axes of said jaws, means acting between said jaws and said supporting base exerting a bias on said jaws toward said unlocked position, a pin secured to one of said jaws, the other of said jaws having a slot formed therein in which said pin resides for limited movement between the opposite ends of said slot corresponding to the upper unlocked position and lower locked position respectively of said jaws, and upper convexly curved supporting surfaces on said jaws adapted to tangentially engage and support the underside of the kingpin end of a semi-trailer whereby the weight thereof moves said jaws downwardly against said bias to cause said jaws to grip the kingpin adapted to be received thereby.

7. Means for the reception of a semi-trailer kingpin comprising a supporting base, a pair of jaws each supported by said base for pivotal movement about a horizontal pivot axis and defining an opening therebetween for the reception of a semi-trailer kingpin, said jaws having an upper unlocked position in which the opening defined therebetween is larger than the kingpin to be received thereby and a lower locked position in which said opening is substantially the same size as the kingpin to be received thereby and the axis of said opening with said jaws in locked position is normal to and spaced between the pivot axes of said jaws, means acting between said jaws and supporting base exerting a bias on said jaws toward said unlocked position, upper convexly curved supporting surfaces on said jaws adapted to tangentially engage and support the underside of the kingpin end of a semi-trailer whereby the weight thereof moves said jaws downwardly against said bias to cause said jaws to grip the kingpin adapted to be received thereby, and means to lock said jaws in said lower locked position.

8. Means for the reception of a semi-trailer kingpin comprising a supporting base, a pair of jaws each supported by said base for pivotal movement about a horizontal axis and defining an opening therebetween for the reception of a semi-trailer kingpin, said jaws having an upper unlocked position in which the opening defined therebetween is larger than the kingpin to be received thereby and a lower locked position in which said opening is substantially the same size as the kingpin to be received thereby, means acting between said jaws and supporting base exerting a bias on said jaws toward said unlocked position, upper convexly curved supporting surfaces on said jaws adapted to tangentially engage and support the underside of the kingpin end of a semi-trailer whereby the weight thereof moves said jaws downwardly against said bias to cause said jaws to grip the kingpin adapted to be received thereby, means to lock said jaws in said lower locked position said latter means comprising a horizontal shaft journaled for rotation on said base and having a weight secured thereon, a pair of spaced abutments one on said base and the other on one of said jaws, the spacing of said abutments when said jaws are in said upper unlocked position being less than the width of said weight and when in said lower locked position being substantially the same as the width of said weight so that said weight may be received therebetween to prevent upward movement of said jaws.

9. Means for the reception of a semi-trailer kingpin comprising a supporting base, a pair of jaws each supported by said base for pivotal movement about a horizontal axis and defining an opening therebetween for the reception of a semi-trailer kingpin, said jaws having an upper unlocked position in which the opening defined therebetween is larger than the kingpin to be received thereby and a lower locked position in which said opening is substantially the same size as the kingpin to be received thereby, means acting between said jaws and supporting base exerting a bias on said jaws toward said unlocked position, upper convexly curved supporting surfaces on said jaws adapted to tangentially engage and support the underside of the kingpin end of a semi-trailer whereby the weight thereof moves said jaws downwardly against said bias to cause said jaws to grip the kingpin adapted to be received thereby, means to lock said jaws in said lower locked position said latter means comprising a horizontal shaft journaled for rotation on said base and having a weight secured thereon, a pair of spaced abutments one on said base and the other on one of said jaws, the spacing of said abutments when said jaws are in said upper unlocked position being less than the width of said weight and when in said lower locked position being substantially the same as the width of said weight so that said weight may be received therebetween to prevent upward movement of said jaws, and a pawl mounted on said supporting base adjacent the abutment thereon and pivotable about an axis parallel to and above the horizontal pivoting axis of one of said jaws, said pawl being weighted so that it tends to fall against one of said jaws between said weight and the space between said abutments, a handle on said shaft operable to turn said shaft to remove said weight from between said abutments when so situated, said pawl being adapted to fall between said weight and space between said abutments to prevent re-entry of said weight between said abutments when said jaws are in said lower locked position, said pawl being movable by the one of said jaws upon movement of said latter jaw to its upper unlocked position to thereby move said pawl from in front of said weight to thereby reset said jaws for movement to their lower locked position and for locking them in said lower locked position by said weight.

References Cited in the file of this patent

UNITED STATES PATENTS

| | | |
|---|---|---|
| 689,074 | Ferris | Dec. 17, 1901 |
| 1,575,435 | Maynard | Mar. 2, 1926 |
| 2,936,983 | Markestein et al. | May 17, 1960 |